(12) United States Patent
Wittig

(10) Patent No.: US 10,670,086 B2
(45) Date of Patent: Jun. 2, 2020

(54) CONTINUOUS TORQUE APPLIANCE TRANSMISSION SHIFTER

(71) Applicant: Illinois Tool Works Inc., Glenview, IL (US)

(72) Inventor: Mark J. Wittig, Frankfort, IL (US)

(73) Assignee: Illinois Tool Works Inc., Glenview, IL (US)

( * ) Notice: Subject to any disclaimer, the term of this patent is extended or adjusted under 35 U.S.C. 154(b) by 126 days.

(21) Appl. No.: 16/112,239

(22) Filed: Aug. 24, 2018

(65) Prior Publication Data

US 2019/0063509 A1 Feb. 28, 2019

Related U.S. Application Data

(60) Provisional application No. 62/549,757, filed on Aug. 24, 2017.

(51) Int. Cl.
| F16D 23/12 | (2006.01) |
| F16H 1/06 | (2006.01) |
| F16D 11/14 | (2006.01) |
| F16D 28/00 | (2006.01) |
| D06F 37/30 | (2020.01) |
| F16D 48/06 | (2006.01) |

(52) U.S. Cl.
CPC ............. F16D 23/12 (2013.01); D06F 37/30 (2013.01); F16D 11/14 (2013.01); F16D 28/00 (2013.01); F16D 48/064 (2013.01); F16H 1/06 (2013.01); F16D 2023/123 (2013.01); F16D 2500/1023 (2013.01); F16D 2500/3021 (2013.01)

(58) Field of Classification Search
None
See application file for complete search history.

(56) References Cited

U.S. PATENT DOCUMENTS

| 2,897,933 | A | * | 8/1959 | Jean | F16D 48/064 |
| | | | | | 192/84.91 |
| 3,328,983 | A | * | 7/1967 | Brucken | F16D 27/108 |
| | | | | | 68/12.24 |
| 3,473,638 | A | * | 10/1969 | Brucken | F16D 27/108 |
| | | | | | 192/3.56 |
| 4,468,938 | A | * | 9/1984 | McMillan | D06F 23/04 |
| | | | | | 68/171 |
| 4,969,341 | A | * | 11/1990 | Burk | D06F 37/40 |
| | | | | | 68/23.7 |
| 5,000,016 | A | * | 3/1991 | Burk | D06F 37/40 |
| | | | | | 68/23.7 |
| 5,651,277 | A | * | 7/1997 | Richardson | D06F 37/40 |
| | | | | | 68/133 |
| 6,012,306 | A | * | 1/2000 | Raes | D06F 25/00 |
| | | | | | 68/122 |
| 7,107,789 | B1 | | 9/2006 | Bruner | |
| 8,733,189 | B2 | | 5/2014 | Durfee | |
| 9,290,882 | B2 | * | 3/2016 | Batt | D06F 23/04 |

* cited by examiner

Primary Examiner — Colby M Hansen
(74) Attorney, Agent, or Firm — Boyle Fredrickson, S.C.

(57) ABSTRACT

A washing machine transmission actuator employs a rotating cam for separating a clutch. The cam is rotated by a ring gear communicating with a pinion gear on a motor providing improved minimum torque for a given motor power and thus improved energy efficiency.

16 Claims, 4 Drawing Sheets

CONTINUOUS TORQUE APPLIANCE TRANSMISSION SHIFTER

CROSS-REFERENCE TO RELATED APPLICATIONS

This application claims the benefit of US provisional application 62/549,757 filed Aug. 24, 2017 and hereby incorporated by reference.

FIELD OF THE INVENTION

The present invention relates to clothes washing machines and the like and specifically to an electronic shifting mechanism for washing machine transmissions.

BACKGROUND OF THE INVENTION

Washing machines, for example, for commercial or residential use, may provide an internal spin basket into which clothing may be placed. An agitator may extend into the spin basket for agitating or stirring the clothing during washing. The agitator and spin basket fit within a washtub retaining the water used for washing, and the water with the clothing inside the spin basket is drained through apertures in the spin basket.

In the process of washing, the washtub may be partially filled with water and/or detergent and other cleaning materials and the agitator may be reciprocated to dislodge dirt from the clothing. After or between one or more cycles of cleaning and rinsing, the water may be drained from the washtub and the spin basket may be rotated rapidly in a spin cycle to remove water from the clothing by centrifugal force.

The various motions of the spin basket and agitator may be provided by a motor/transmission assembly typically mounted on the outside of the washtub as supported by the washtub. The washtub itself is normally suspended from the washing machine housing so as to permit slight movement of the washtub with respect to the housing of the washing machine during operation. This mounting reduces the transmission of vibration from the washtub to the housing during the washing operations.

The transmission may be shifted by an electronically controlled shifter actuated by the washing machine controller. The shifter provides an electric motor attached to rotate a crank having a linkage that pivotally connects between the crank and a shifter arm of the transmission. Motion of the electric motor moves the shifter arm through the linkage.

Over time, the shifter or transmission may become contaminated with oil from the transmission and/or environmental dirt causing increased loading on the shifter preventing proper operation.

SUMMARY OF THE INVENTION

The present invention provides a modified transmission and shifter mechanism that eliminates the crank linkage between the shifter and transmission such as provides irregular torque over its operating range in favor of a direct drive gear system. By providing a more uniform torque, improved reliability can be obtained while preserving an efficient sizing of the electric motor.

Specifically, in at least one embodiment, the invention provides a washing machine transmission actuator for control of a washing machine transmission and having a drive wheel communicating with a first motor to rotate the drive wheel about a first axis. A clutch operates to engage first and second clutch portions positioned between the drive wheel and the spin basket, the first clutch portion movable along the first axis between a first clutch state engaging the second clutch portion so that rotation of the drive wheel rotates the spin basket and a second clutch state separated from the second clutch portion so that the drive wheel rotates independently of the spin basket. A cam communicates with the first clutch portion and is rotatable about the first axis between a first cam state moving the first clutch portion to the first clutch state and a second cam state moving the first clutch portions of the second clutch state. The cam includes a peripheral gear which may be driven by a corresponding pinion gear attached to the shaft of a second motor so that activation of the second motor moves the cam around the first axis between the first cam state and the second cam state.

It is thus a feature of at least one embodiment of the invention to address a problem of premature failure when the cam activation force exceeds a minimum torque provided by a toggle arm system. By providing more consistent torque, longer transmission operating life is obtained without the need for a higher torque motor and corresponding cost and energy consumption.

The pinion gear and peripheral gear may be sized to provide no less than a 4:1 speed reduction from a rotation of motor shaft to a rotation of the cam ring.

It is thus a feature of at least one embodiment of the invention to provide improved selection of mechanical advantage possible with the gearing system, difficult with a toggle arm system.

The second motor may be an AC gearmotor.

It is thus a feature of at least one embodiment of the invention to permit the pinion gear to be increased in size for a given mechanical advantage by adjustment of the gearmotor gearing ratio providing advantageous manufacture and resistance to contamination.

The first clutch portion may provide a clutch body surrounding the first axis and having a radially-extending flange and wherein the cam provides a ring extending around the clutch portion body to rotate about the first axis and further provides an axial force on the radially-extending flange to move the first clutch portion.

It is thus a feature of at least one embodiment of the invention to employ a self-centering cam that can operate on the first clutch portion at a variety of angular orientations consistent with rotation of the first clutch portion with the spin basket.

The clutch body may provide a bearing surface for the ring guiding the ring in coaxial rotation with the clutch body against radial force from the pinion gear to the peripheral gear.

It is thus a feature of at least one embodiment of the invention to provide simple integration of the gear transmission onto a ring cam without the need for an auxiliary bearing shaft.

The ring may have a first side sliding against a radially-extending surface of the flange and a second side opposite the first side having at least one cam ramp engaging a follower surface axially fixed with respect to rotation about the first axis.

It is thus a feature of at least one embodiment of the invention to provide a simple camming system that can operate against the rotating clutch. By moving the cam ramps away from the flange, the interface between the first clutch portion and ring may be smooth to permit mutual rotation therebetween.

The ring may have multiple cam ramps engaging the follower surface.

It is thus a feature of at least one embodiment of the invention to provide smooth translation motion reducing binding.

Each cam ramp face may subtend an angle of less than 10 degrees.

It is thus a feature of at least one embodiment of the invention to allow quick clutch engagement and disengagement even with high mechanical advantage in the gearing system.

The washing machine transmission actuator may further include a sensor for sensing a position of the cam ring system with respect to movement between the first cam state and the second cam state. In this respect, the sensor may sense a rotated position of the first cam ring about the first axis with respect to a location of the pinion gear.

It is thus a feature of at least one embodiment of the invention to permit clutch position determination in a continuously rotatable pinion gear.

The ring of the washing machine transmission actuator may be a thermoplastic material integrally molded with the peripheral teeth.

It is thus a feature of at least one embodiment of the invention to provide a simple and robust drive mechanism for the cam ring.

Other features and advantages of the invention will become apparent to those skilled in the art upon review of the following detailed description, claims and drawings in which like numerals are used to designate like features.

Figure 1:
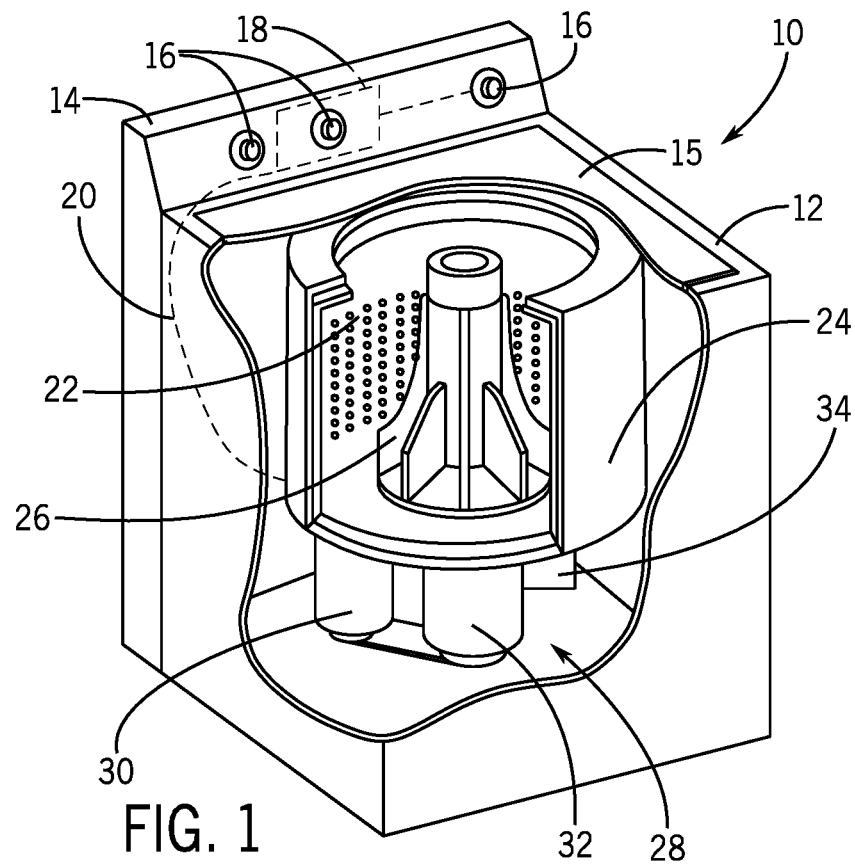
FIG. 1 is a perspective cutaway view of an automatic washer suitable for use with the present invention showing an agitator within a spin basket held within a washtub, the latter supporting a motor and transmission system including an electronic shifter.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, a washing machine 10 may provide for an outer housing 12 having a control console 14 at the rear edge thereof providing for controls 16 (such as switches and indicator lights) for controlling the operation of the washing machine 10. The control 16 may communicate with an internal controller 18 typically providing for a microprocessor executing a stored program for control of the washing machine 10 and communicating with various components of the washing machine 10 through a wiring harness 20. The outer housing 12 may provide a hinged lid 15 at the top that may be opened for access by a user to the interior of a spin basket 22, the latter fitting inside a washtub 24. An agitator 26 may extend upward from the bottom of the spin basket 22 as is generally understood in the art.

Figure 2:
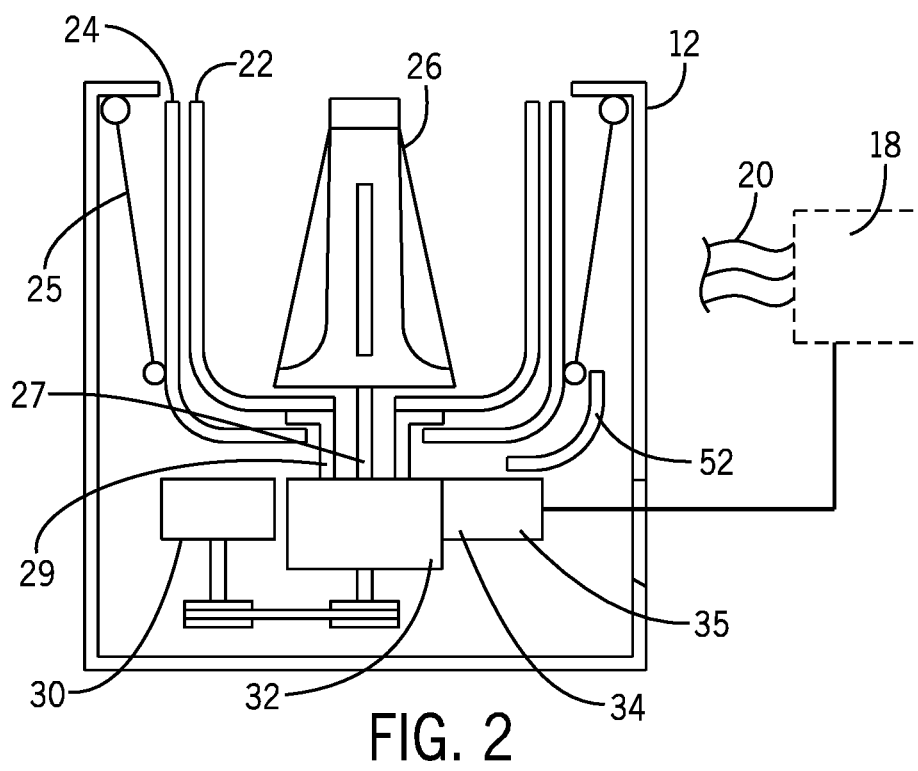
FIG. 2 is an elevational cross-section of the automatic washer of FIG. 1 showing suspension of the transmission with respect to the washtub.

Referring now to FIG. 2, the washtub 24 may be generally suspended on damper rods 25 or the like from the housing 12 to provide for some lateral motion during use. Suspended at the, bottom outside of the washtub 24 may be a transmission drive assembly 28 including a motor 30, a transmission 32, and a transmission shifter 34 communicating with the transmission 32 to change its mode of operation between conducting motion of the motor 30 to the agitator 26 through shaft 27 and conducting motion of the motor 30 to the spin basket 22 through collar 29. The transmission shifter 34 will generally have a housing 35 that may be physically attached to the transmission 32 by machine screws or the like (not shown) or otherwise attached to a common supporting structure. In this way, the transmission shifter 34 will move with the transmission 32, the latter of which adopts the motion of the washtub 24 on which it is supported.

Generally, the transmission shifter 34 may communicate through a wiring harness 20 with the controller 18 to receive power and control signals therefrom and to provide sensor signals thereto. An example transmission 32 and washing machine 10 is described in U.S. patent application Ser. No. 10/064,890 entitled: "Drive Mechanism for an Automatic Washer" hereby incorporated by reference in its entirety.

Figure 3:
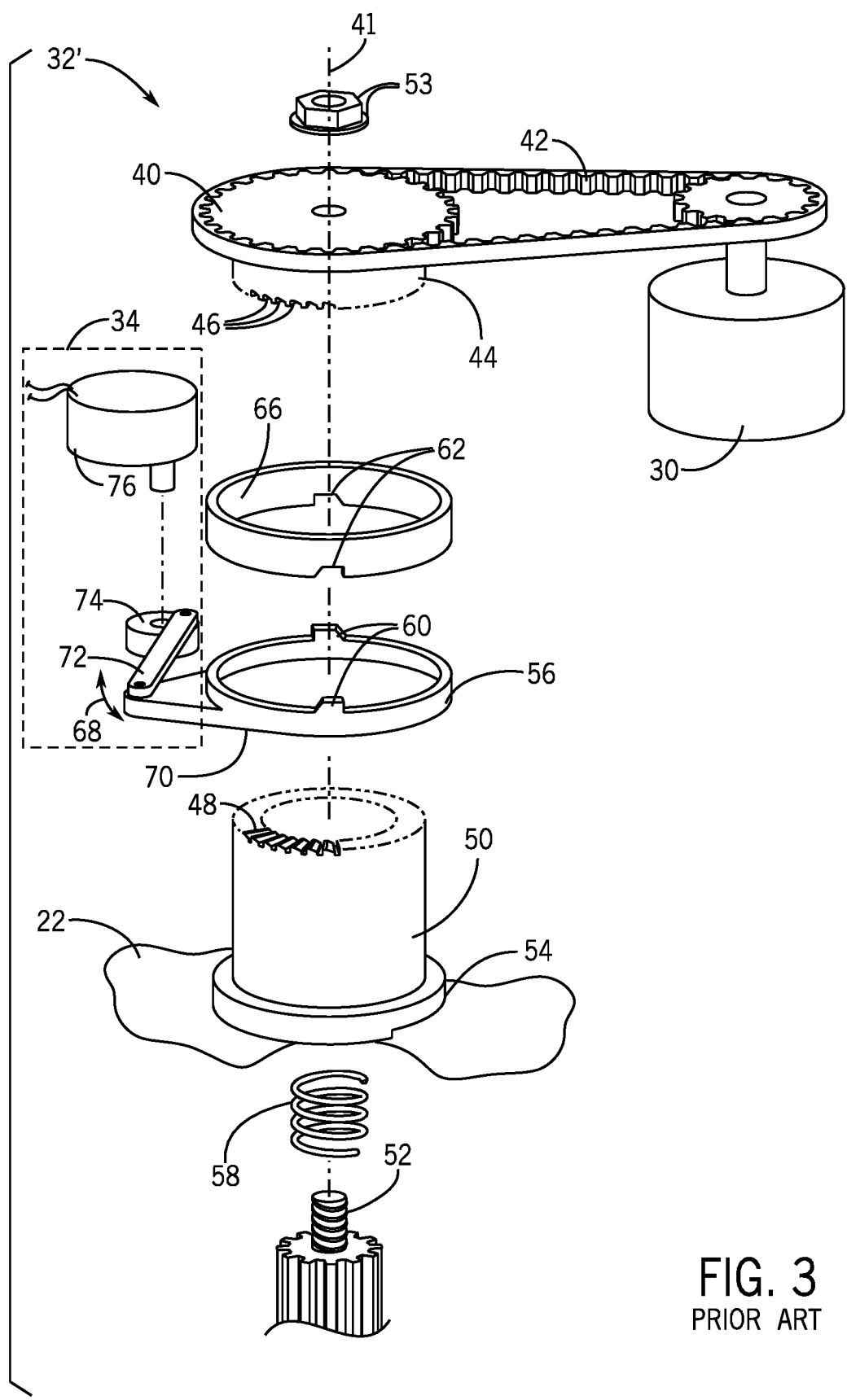
FIG. 3 is an exploded view of a prior art transmission and shifter using a toggle arm drive.

Referring now to FIG. 3, the present invention may integrate readily with existing elements of a prior art transmission 32' without extensive redesign of the washing machine 10 and transmission 32'. This existing transmission 32' may provide a drive wheel 40 communicating with the motor 30 through a toothed belt 42 to rotate about a drive axis 41. The drive wheel 40 attaches to a first clutch half 44 being generally a cylindrical ring attached to and concentric with the drive wheel 40 about axis 41 having exposed crown teeth 46 along the base of the ring. These teeth 46 may engage corresponding crown teeth 48 of a similarly sized second clutch half 50 so that the first clutch half 44 and second clutch half 50 turn together when the teeth are engaged (in a first state) and may rotate independently when the teeth are not engaged (in a second state).

A driveshaft 52 may engage with the second clutch half 50 of the toothed clutch which is also tubular to fit around the driveshaft 52. The driveshaft 52 may also engage with the drive wheel 40 for direct drive thereby, for example, as retained by nut and washer 53.

Movement of the second clutch half 50 along axis 41 controls a path of torque transmission from the drive wheel 40 to the second clutch half 50 which is attached to the spin basket 22 to allow shifting between agitation and spin according to techniques generally known in the art.

Movement of the second clutch half 50 is provided by means of axial force applied to a radially-extending flange 54 on the second clutch half 50 positioned at an end of the second clutch half 50 opposite the end having teeth 48. A shifter ring 56 fits around the second clutch half 50 to rest against the radial lip of this flange 54 and slide smoothly thereagainst so that movement of the shifter ring 56 along the axis 41 also moves the second clutch half 50 when the second clutch half 50 is spinning with respect to the shifter ring 56. The second clutch half 50 is biased by a spring 58 toward the first clutch half 44 and, accordingly, the force of the shifter ring 56 works against this biasing spring 58. When the shifter ring 56 does not apply a force to the second clutch half 50, the first clutch half 44 and second clutch half 50 engage to rotate together.

Figure 5A:
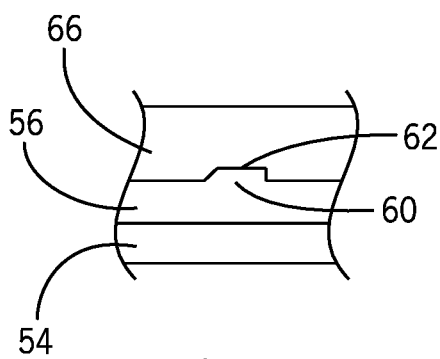
FIGS. 5a and 5b are fragmentary side elevational views of an engagement between a drive ring and stationary cam ring of FIGS. 3 and 4.

Referring also to FIG. 5a, an axially perpendicular surface of the shifter ring 56 removed from contact with the flange 54 includes one or more axially extending ramps 60. In a first state, these ramps 60 may fit within corresponding notches 62 in a stationary cam ring 66 fixed with respect to the housing of the transmission 32' and generally fixed with respect to rotation about axis 41. This interfitting allows the second clutch half 50 to move under the urging of spring 58 to engage with the first clutch half 44. Generally the ramps 60 may subtend an angle of 61 (shown in FIG. 6) of less than 10 degrees about an axis 41.

Figure 5B:
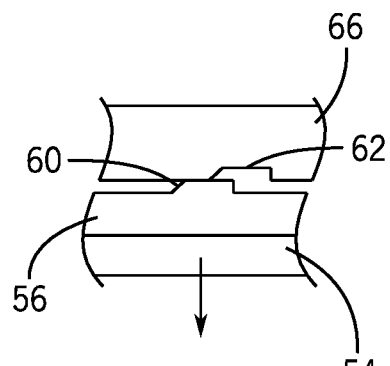

Referring now to FIGS. 3 and 5b, in a second state, the shifter ring 56 may be rotated about axis 41 sliding along the outer surface of the tubular second clutch half 50 so that ramps 60 disengage from notches 62. This disengagement presses the shifter ring 56 toward the flange 54 against the urging of spring 58 to disengage second clutch half 50 from first clutch half 44 in a second state.

Rotation 68 of the shifter ring 56 is provided by a tangential force applied to the shifter ring 56 by a shifter arm 70 extending radially outward from axis 41 from a periphery of the shifter ring 56. The shifter arm 70 pivotally attaches to a tangentially extending linkage arm 72 which in turn is pivotally attached to a crank 74 rotated by a gearmotor 76. The gearmotor 76 is fixed with respect to the housing of the transmission 32.

Figure 6:
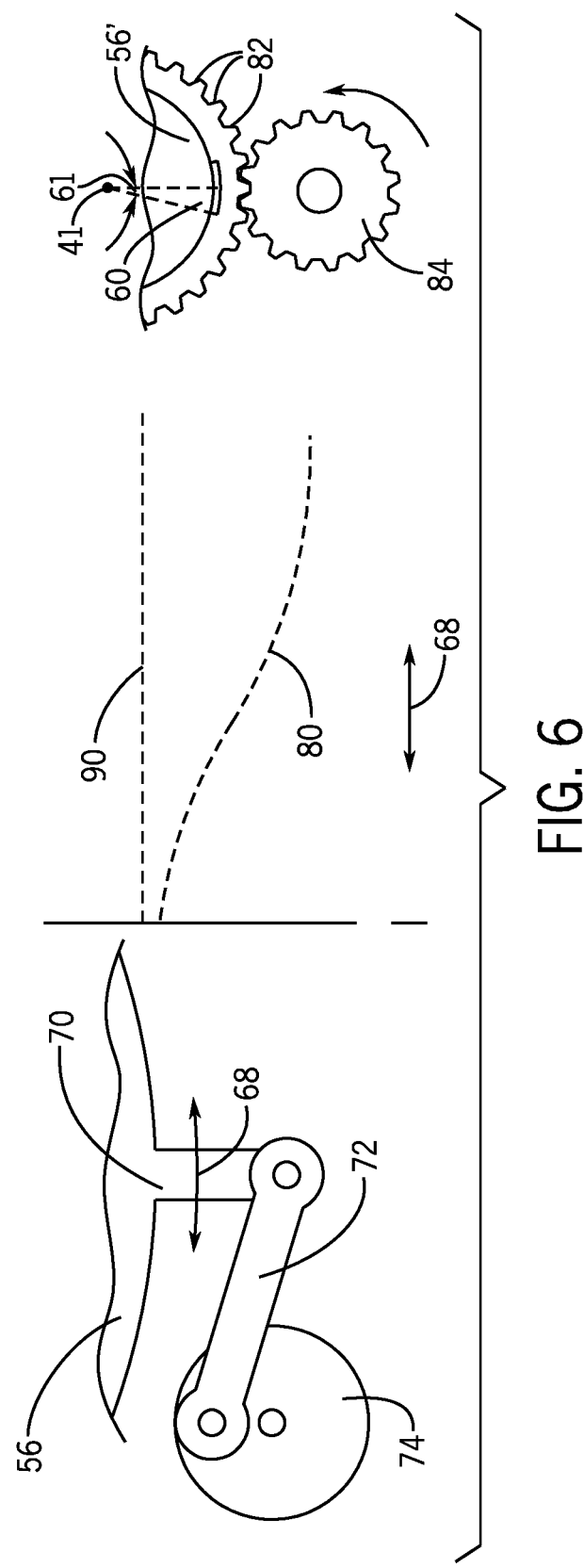
FIG. 6 is a diagrammatic representation of the embodiments of FIGS. 3 and 4 and corresponding plots of torque versus shifter angle showing an improved torque profile.

Referring now to FIG. 6, because of the geometry of the crank 74, linkage arm 72, and shifter arm 70, a torque applied to the shifter ring 56 indicated by plot line 80 is uneven tending to decrease as the pivot points on the ends of the linkage arm 72 align along a line between the axis of rotation of the crank 74 and the pivot between the linkage arm 72 and the shifter arm 70. This uneven torque allows the shifter ring 56 to jam at relatively low friction levels that exceed the lowest torque value.

Figure 4:
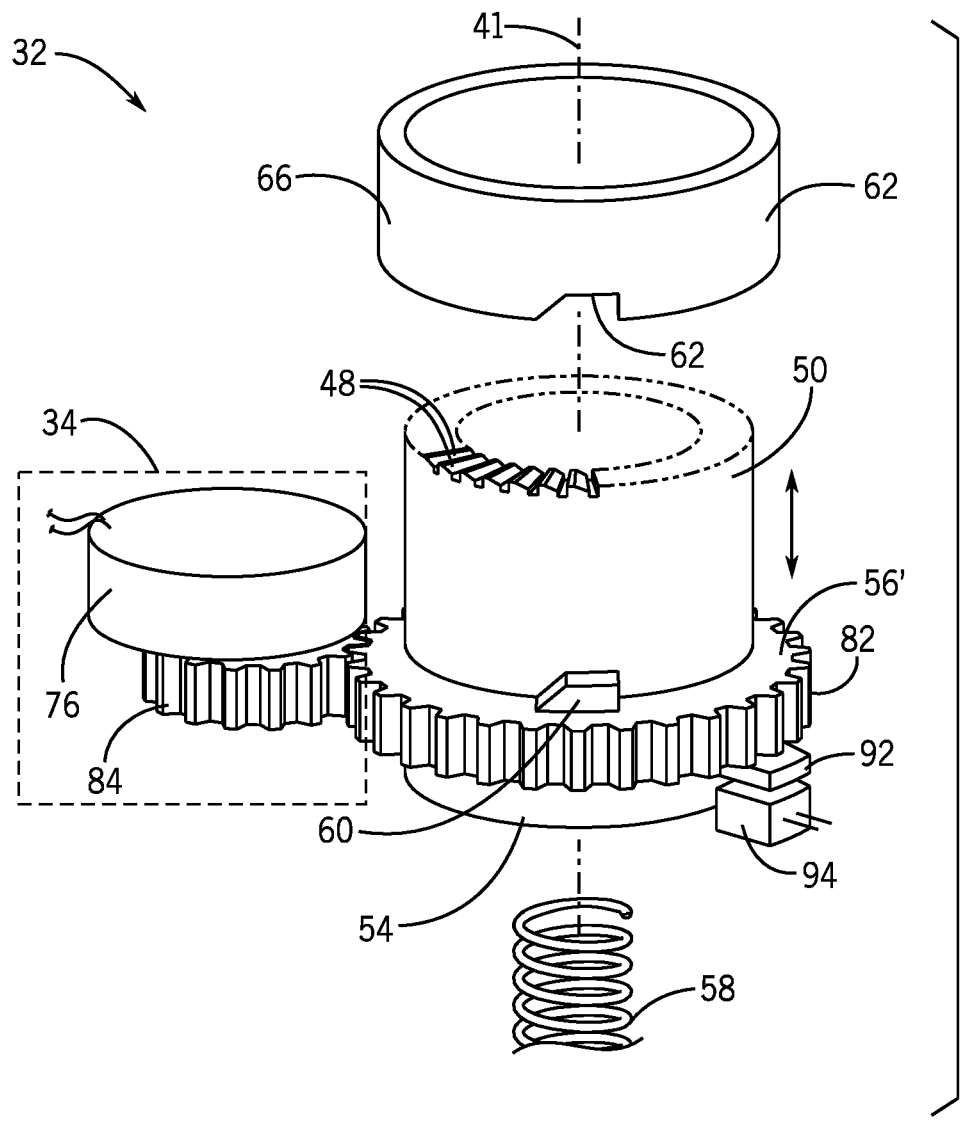
FIG. 4 is an exploded view of alternative components of the transmission shifter that may be integrated into the existing prior art system of FIG. 3.

Referring now to FIG. 4, the present invention modifies the shifter ring 56 shown in FIG. 3 to eliminate the shifter arm 70 and instead to provide gear teeth 82 extending radially outward about the outer circular periphery of a modified shifter ring 56'. As before, as shown in FIG. 3, the modified shifter ring 56' rides along the upper surface of the flange 54 to press downward against the biasing spring 58 as axially extending ramps 60 on the modified shifter ring 56' interact with corresponding notches 62 on the stationary cam ring 66 as shown in FIGS. 5a and 5b. This interaction with rotation of the modified shifter ring 56' provides the same axial movement of the modified shifter ring 56' and the second clutch half 50 along axis 41 in order to shift the transmission 32. In this case, however, modified shifter ring 56' does not include a shifter arm 70 but instead directly engages a pinion gear 84 directly driven by the gearmotor 76. In all other respects, transmission 32 operates similarly and includes the components shown in FIG. 3.

Referring again to FIG. 6, this more direct drive between pinion gear 84 and teeth 82 on the outside of modified shifter ring 56' provides a more constant torque 90 prolonging the ability of a given size motor to move the second clutch half 50 as resistive forces rise until the resistive forces rise to the peak torque provided by the drive system.

Referring again to FIG. 4, the modified shifter ring 56' may include an outwardly extending tab 92 or similar feature that may interact with a microswitch 94 or other sensor to allow control of the gearmotor 76 to provide the necessary movement between the two states of engagement and disengagement shown with respect to FIGS. 4a and 4b. In that control, the motor 76 may be operated until a desired state is sensed by the sensor microswitch 94. Generally, the controller 18 (shown in FIG. 2) will execute a stored program to move the shifter ring 56' between its first and second states depending on whether agitation or spin is required during various wash cycles implemented by the controller 18 according to techniques known in the art. The microswitch 94 is fixed with respect to the housing of the transmission 32'.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A washing machine transmission actuator for control of a washing machine transmission and comprising:
   a drive wheel communicating with a first motor to rotate the drive wheel about a first axis;
   a clutch having engaging first and second clutch portions positioned between the drive wheel and a spin basket, the first clutch portion movable along the first axis between a first clutch state engaging the second clutch portion so that rotation of the drive wheel rotates the spin basket and a second clutch state separated from the second clutch portion so that the drive wheel rotates independently of the spin basket;
   a cam communicating with the first clutch portion and rotatable about the first axis between a first cam state moving the first clutch portion to the first clutch state and a second cam state moving the first clutch portion to the second clutch state;
   wherein the cam includes a peripheral gear;
   a second motor having a shaft; and
   a pinion gear attached to the shaft of the second motor to engage the peripheral gear so that activation of the second motor moves the cam around the first axis between the first cam state and the second cam state.

2. The washing machine transmission actuator of claim 1 wherein the pinion gear and peripheral gear are sized to provide no less than a 4:1 speed reduction from a rotation of motor shaft to a rotation of the cam.

3. The washing machine transmission actuator of claim 2 wherein the second motor is an AC gearmotor.

4. The washing machine transmission actuator of claim 1 wherein the first clutch portion provides a clutch body surrounding the first axis and having a radially-extending flange and wherein the cam provides a ring extending around the first clutch portion body to rotate about the first axis and further provides an axial force on the radially-extending flange to move the first clutch portion.

5. The washing machine transmission actuator of claim 4 wherein the clutch body provides a bearing surface for the ring guiding the ring in coaxial rotation with the clutch body against radial force from the pinion gear to the peripheral gear.

6. The washing machine transmission actuator of claim 4 wherein the ring has a first side sliding against a radially-extending surface of the flange and a second side opposite the first side having at least one cam ramp engaging a follower surface axially fixed with respect to rotation about the first axis.

7. The washing machine transmission actuator of claim 6 wherein the ring has multiple cam ramps engaging the follower surface.

8. The washing machine transmission actuator of claim 7 wherein each cam ramp subtends an angle of less than 10 degrees.

9. The washing machine transmission actuator of claim 1 further including a sensor for sensing a position of the cam with respect to movement between the first cam state and the second earn state.

10. The washing machine transmission actuator of claim 9 wherein the sensor senses a rotated position of the cam about the first axis with respect to a location of the pinion gear.

11. The washing machine transmission actuator of claim 9 further including a controller reading the sensor to control the second motor to move the cam successively between the first cam position and the second cam position according to the sensor and a washing cycle state controlled by the controller.

12. The washing machine transmission actuator of claim 1 further including a spring axially biasing the first and second clutch portions to the first clutch state.

13. The washing machine transmission actuator of claim 1 wherein the peripheral gear has radially outwardly extending teeth to engage the pinion gear rotating parallel to the first axis hut offset therefrom.

14. The washing machine transmission actuator of claim 1 wherein the first and second clutch portions have inter-engaging crown teeth positioned radially about the first axis and extending parallel to the first axis.

15. The washing machine transmission actuator of claim 1 wherein the first and second clutch portions fit coaxially around a driveshaft communicating between the drive wheel and an agitator within the spin basket.

16. The washing machine transmission actuator of claim 1 wherein the cam is a thermoplastic material integrally molded with the peripheral teeth.

* * * * *